(12) United States Patent
Castaing

(10) Patent No.: US 10,771,539 B2
(45) Date of Patent: Sep. 8, 2020

(54) SYSTEMS AND METHODS FOR CROSS-CLUSTER SERVICE PROVISION

(71) Applicant: Amadeus S.A.S., Sophia Antipolis (FR)

(72) Inventor: Thibaud Nicolas Castaing, Waltham, MA (US)

(73) Assignee: Amadeus S.A.S., Sophia Antipolis (FR)

( * ) Notice: Subject to any disclaimer, the term of this patent is extended or adjusted under 35 U.S.C. 154(b) by 132 days.

(21) Appl. No.: 16/007,737

(22) Filed: Jun. 13, 2018

(65) Prior Publication Data

US 2019/0007482 A1  Jan. 3, 2019

Related U.S. Application Data

(60) Provisional application No. 62/521,339, filed on Jun. 16, 2017.

(51) Int. Cl.
| | |
|---|---|
| *H04L 29/08* | (2006.01) |
| *G06F 9/455* | (2018.01) |
| *G06F 11/30* | (2006.01) |
| *G06F 9/50* | (2006.01) |
| *H04L 12/24* | (2006.01) |
| *H04L 12/26* | (2006.01) |

(52) U.S. Cl.
CPC ...... *H04L 67/1008* (2013.01); *G06F 9/45558* (2013.01); *G06F 9/505* (2013.01); *G06F 11/3006* (2013.01); *G06F 11/3055* (2013.01); *H04L 41/0663* (2013.01); *H04L 43/0817* (2013.01); *H04L 67/02* (2013.01); *H04L 67/1034* (2013.01); *G06F 2009/45591* (2013.01)

(58) Field of Classification Search
CPC ......... H04L 67/02; H04L 12/26; H04L 29/08; H04L 67/16; H04L 43/0876; H04L 43/10; H04L 41/5096; H04L 43/04; G06F 2209/501; G06F 9/5027
See application file for complete search history.

(56) References Cited

U.S. PATENT DOCUMENTS

| | | | | |
|---|---|---|---|---|
| 9,208,032 | B1* | 12/2015 | McAlister | ........... G06F 11/1471 |
| 10,296,411 | B1* | 5/2019 | Diggins | .............. G06F 11/0793 |
| 2011/0145836 | A1* | 6/2011 | Wheeler | ................. G06F 9/546 719/314 |

(Continued)

*Primary Examiner* — Chirag R Patel
(74) *Attorney, Agent, or Firm* — Finnegan, Henderson, Farabow, Garrett & Dunner LLP

(57) ABSTRACT

Computer-implemented methods and systems are provided for cross-cluster service provision. Consistent with disclosed embodiments, a system for cross-cluster service provision includes a first computing cluster and a second computing cluster. The first cluster includes service-providing nodes, and a first controller that collects status information concerning the service-providing nodes, the status information indicating at least one service-providing node endpoint. The second computing cluster includes service-consuming nodes, a service that receives requests for the service from the service-consuming nodes and distributes the requests among a set of specified endpoints, and a second controller that performs health checks on the specified endpoints, retrieves the status information from the first controller, and updates the set of specified endpoints based on the status information.

16 Claims, 3 Drawing Sheets

(56) References Cited

U.S. PATENT DOCUMENTS

| | | | |
|---|---|---|---|
| 2013/0086212 A1* | 4/2013 | MacInnis | H04L 67/16 |
| | | | 709/217 |
| 2014/0215057 A1* | 7/2014 | Walsh | H04L 67/025 |
| | | | 709/224 |
| 2015/0286684 A1* | 10/2015 | Heinz | G06F 16/24549 |
| | | | 707/769 |
| 2016/0301739 A1* | 10/2016 | Thompson | H04L 67/2804 |
| 2018/0091413 A1* | 3/2018 | Richards | H04L 12/4641 |
| 2018/0367479 A1* | 12/2018 | Menchaca | H04L 67/02 |

* cited by examiner

SYSTEMS AND METHODS FOR CROSS-CLUSTER SERVICE PROVISION

CROSS-REFERENCE TO RELATED APPLICATIONS

This application claims the benefit of priority under 35 U.S.C. § 119(e) to U.S. Provisional Application No. 62/521,339, filed Jun. 16, 2017, and titled "Systems and Methods for Cross-Cluster Service Provision," which is hereby incorporated by reference in its entirety

TECHNICAL FIELD

The disclosed embodiments concern the use of container-based software deployment and management technologies. More specifically, the disclosed embodiments concern automating deployment, scaling, and management of containerized external services across local and remote clusters.

BACKGROUND

A computing cluster hosting an instance of a cloud service platform can be configured to access an external service provider, such as an SQL database or another computing cluster. The computing cluster may be provisioned with endpoints for accessing services provided by this external service provider. But these endpoints may become unreachable, inhibiting the ability of the computing cluster to access the services. Furthermore, configuration changes in the external service provider can affect the endpoints the external service provider exposes, again inhibiting the ability of the computing cluster to access the services. Accordingly, systems and method are needed for automatically provisioning a computer cluster with external service provider information.

SUMMARY

The disclosed systems and methods enable automatic provisioning of computer clusters with external service provider information. In some embodiments, a computing cluster can be configured to automatically determine reachable endpoints as such endpoints are added and/or removed from an external service provider. For example, when a service-providing node in the service-providing cluster goes online or offline, the cluster accessing the service-providing cluster may automatically be configured to add or remove an endpoint for this service-providing node. In this manner, the computing cluster accessing the service-providing cluster can be automatically updated to reflect dynamic changes in the configuration and accessibility of the service-providing cluster.

The disclosed embodiments include a system for cross-cluster service provision. The system can include a first computing cluster and a second computing cluster. The first computing cluster can include service-providing nodes and a first controller that collects status information concerning the service-providing nodes. The status information can indicate at least one service-providing node endpoint. The second computing cluster can include service-consuming nodes and a service that receives requests for the service from the service-consuming nodes and distributes the requests among a set of specified endpoints. The second computer cluster can further include a second controller that performs health checks on the specified endpoints, retrieves the status information from the first controller, and updates the set of specified endpoints based on the status information.

In some aspects, updating the set of specified endpoints include at least one of adding another endpoint to the set of specified endpoints and removing an existing endpoint from the set of specified endpoints. The second controller can remove endpoints failing the health checks from the set of specified endpoints.

The second controller can request the status information from the first controller repeatedly, periodically, at scheduled times, or in response to an event. In some aspects, the collected status information can include status information for nodes in the first computing cluster including the service-providing nodes. The first controller can determine a subset of the retrieved status information concerning the service-providing nodes. The first controller can further determine the subset of the status information based on labels included in the status information that categorize the nodes.

In some aspects, the retrieved status information can include status information for nodes in the first computing cluster including the service-providing nodes. The second controller can determine a subset of the retrieved status information concerning the service-providing nodes. The second controller can further determine the subset of the retrieved status information based on labels included in the retrieved status information that categorize the service-providing nodes.

The disclosed embodiments include a method for cross-cluster service provision. The method can include receiving, by a first controller on a first computing cluster that includes service-providing nodes associated with endpoints, a request for status information for the service-providing nodes. The method can further include providing, by the first controller to a second controller on a second computing cluster that includes a service object and service-consuming nodes, a response to the request including the status information for the service-providing nodes. The method can also include receiving, by the service-providing nodes through the endpoints, health checks from the second controller and service requests from the service object. The method can further include generating, by the first controller, the response based on status information for the service-providing nodes of the first computing cluster and one or more subsetting criteria.

In some aspects, the request for status information is received repeatedly, periodically, at scheduled times, or in response to an event. The event can include a determination that a number of reachable endpoints for the service object is less than a predetermined threshold, a determination that additional endpoints are required to satisfy performance criteria for the service, and a configuration request.

The disclosed embodiments include a method for cross-cluster service provision. The method can include providing, by a second controller on a second computing cluster that includes a service object and service-consuming nodes to a first controller on a first computing cluster that includes service-providing nodes associated with endpoints, a request for status information for the service-providing nodes. The method can further include receiving, by the second controller from the first controller in response to the request, status information for the service-providing nodes. The method can also include reconfiguring, by the second controller, the service object based on the status information for the service-providing nodes. The method can further include providing, by the second controller, health checks to the service-providing nodes. The method can also include providing, by the service-consuming nodes, service requests from the service object.

As discussed above with regard to other embodiments, in some aspects, the request for status information is provided repeatedly, periodically, at scheduled times, or in response to an event at scheduled times, or in response to an event. The event can include a determination that a number of reachable endpoints for the service object is less than a predetermined threshold, a determination that additional endpoints are required to satisfy performance criteria for the service object, and a configuration request.

In some aspects, the method can further include determining, by the second controller, a subset of the status information based on one or more subsetting criteria and using the subset of the status information to reconfigure the service object. The method can also include reconfiguring the service object includes at least one of specifying another endpoint for the service object and deleting a specified endpoint for the service object. For example, the second controller can reconfigure the service object by deleting specified endpoints for the service object that fail the health checks.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Figure 1:
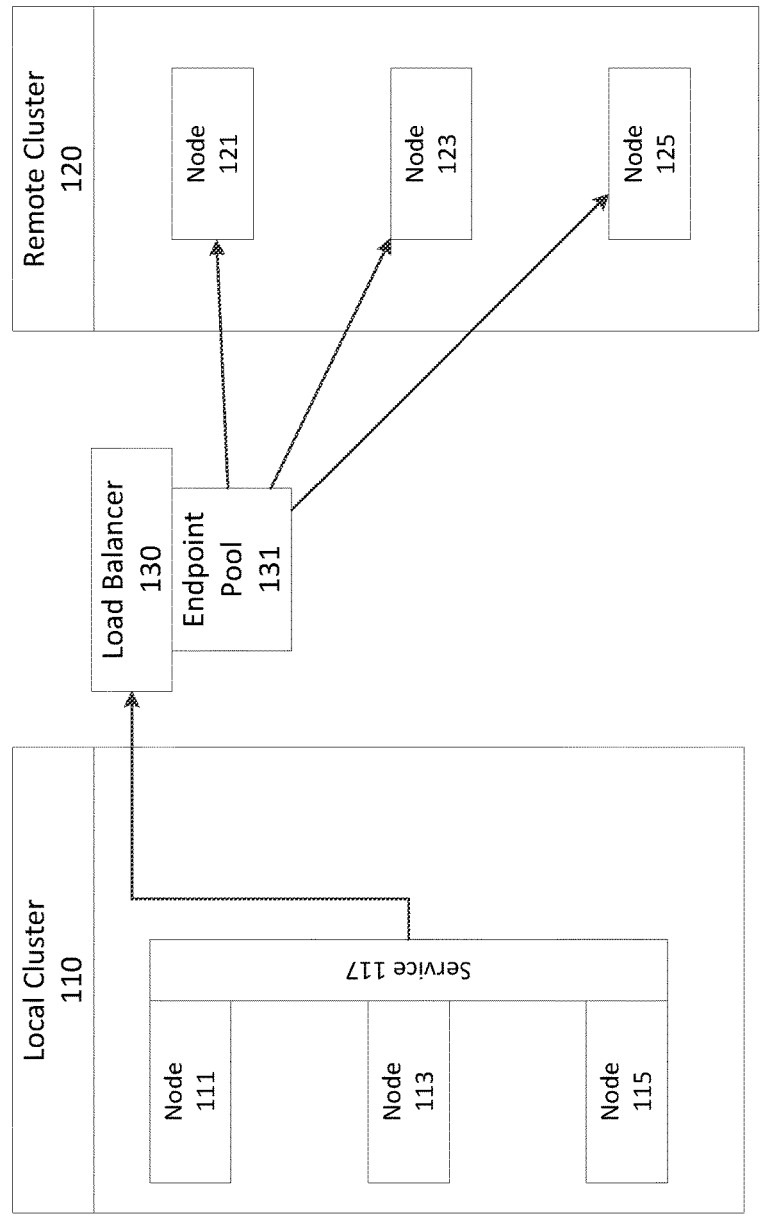
FIG. 1 depicts a conventional system for cross-cluster service provision.

Reference will now be made in detail to the disclosed embodiments, examples of which are illustrated in the accompanying drawings. Wherever convenient, the same reference numbers will be used throughout the drawings to refer to the same or like parts.

Cloud-based application management platforms, such as OPENSHIFT, allow for automated deployment, scaling, and management of containerized applications. These platforms can define groups that include one or more containers that share computing resources. The groups can be configured to provide services (e.g., run applications). A cluster running such a platform can configure nodes to host these groups. Services can be assigned to clusters, which will then automatically handle creation of groups and assignment of groups to nodes to ensure that the service cluster continues to perform the service. For example, if the cluster attempts to provide the service using a node, and the node cannot perform the service, or ceases to perform the service, then the cluster will provide the service using another node.

External services can also be represented in the above-described framework. For example, a service object can be created that represents the external service. During configuration of the service, endpoints can be listed at which the external service can be accessed. The platform can then perform load balancing between the listed endpoints. For example, the external service can be assigned a virtual endpoint (the combination of a virtual IP address and port) and can distribute requests to this virtual endpoint to the listed endpoints provided during the configuration of the service.

A cluster consuming external services may lack the ability to monitor the status of these external services or the nodes providing these external services. In some instances, when the external services are accessible through endpoints, the cluster may not have access to the status of these endpoints. For example, a first cluster may consume services provided by a second cluster. As discussed above, the first cluster can represent the second cluster using a service object with a list of endpoints statically defined upon creation of the service. But should the status of the second cluster change (e.g., a node becomes unavailable, a specific service/port becomes unreachable on the node, etc.), traffic can be sent to an unreachable endpoint. Individual cluster-level controllers configured to monitor node functioning within each cluster do not completely address this problem, as endpoints may become unreachable from the first cluster while the nodes associated with the endpoints continue to function. Monitoring the status of endpoints or the nodes associated with the endpoints using a controller in the first cluster also does not completely address the problem. The controller in the first cluster may continue to monitor the statically defined endpoints or the nodes associated with these endpoints regardless of dynamic changes in the configuration of the second cluster (an increase, decrease, or reassignment of endpoints or nodes in the second cluster).

FIG. 1 depicts a conventional system (system 100) for cross-cluster service provision. This conventional approach introduces a load balancer between the service-consuming cluster and the service-providing cluster. For example, system 100 includes local cluster 110, remote cluster 120, and load balancer 130. Local cluster 110 can include service-consuming nodes (e.g., node 111, node 113, and node 115). Local cluster 110 also includes service 117, which may be a software object representing an external service provided by remote cluster 120. The nodes of local cluster 110 can send requests to service 117.

Remote cluster 120 can include service providing nodes (e.g., node 121, node 123, and node 125). These nodes can be configured to expose endpoints for service requests. Load balancer 130 can be configured to maintain a pool of valid endpoints (e.g., endpoint pool 131) and can periodically confirm that endpoints in endpoint pool 131 are reachable (i.e., load balancer 130 will perform "health checks" of the endpoints). System 100 may be configured to require remote cluster 120 to register endpoints with load balancer 130. These registered endpoints will become part of endpoint pool 131 and be used by load balancer 130 when distributing requests received from local cluster 110.

Figure 2:
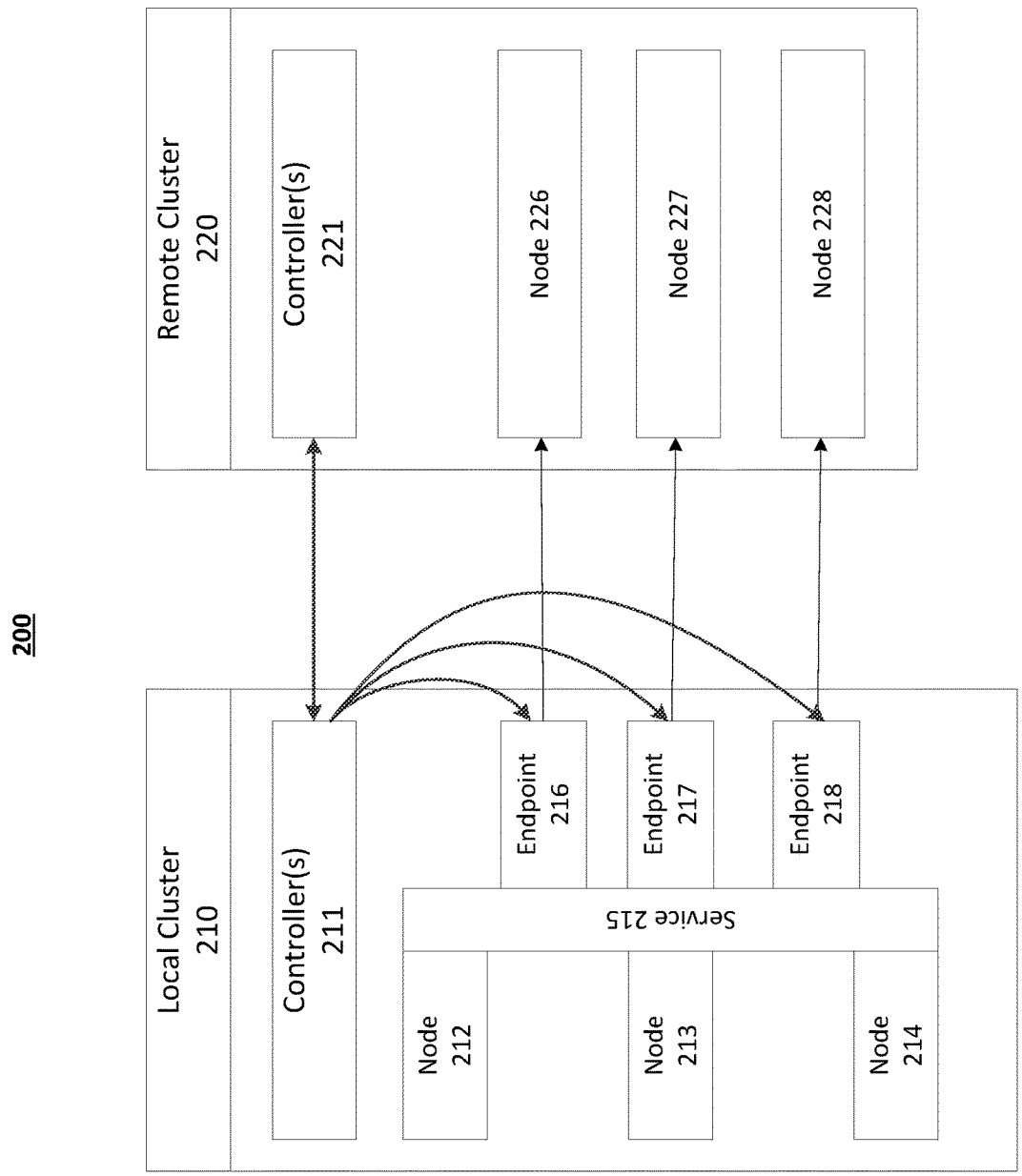
FIG. 2 depicts an exemplary system for cross-cluster service provision.

FIG. 2 depicts an exemplary system (system 200) for cross-cluster service provision consistent with disclosed embodiments. System 200 improves upon system 100 of FIG. 1 by enabling reliable service provision across clusters without requiring external load balancer 130, thereby removing a point of failure and reducing the expense and the complexity of such cross-cluster service provision. In some embodiments, system 200 can instead use load balancing functionality built into the cloud computing platform. Because this exemplary system leverages existing services to manage load balancing, it can be lightweight and can consume fewer computing resources than a system that requires additional software or hardware.

System 200 of FIG. 2 includes local cluster 210 and remote cluster 220. Local cluster 210 can include one or more controllers (e.g., controller(s) 211), service-consuming nodes (e.g., node 212, node 213, and node 214), service object 215, and endpoints (e.g., endpoint 216, endpoint 217, and endpoint 218). Remote cluster 220 can include controller(s) 221 and service-providing nodes (e.g., node 226, node 227, and node 228). In some embodiments, controller(s) 221 can be configured to communicate status information regarding the service-providing nodes of remote cluster 220 to controller(s) 211. This status information can indicate, describe, or concern endpoints exposed by the service providing nodes.

Controller(s) 211 can be configured to use the status information of the service-providing nodes to configure a list of endpoints (e.g., endpoint 216, endpoint 217, and endpoint 218) for service object 215. For example, controller(s) 211 can be configured to monitor the status of these endpoints. As endpoints become unreachable, controller(s) 211 can be configured to remove them from the list of endpoints maintained by service object 215. Controller(s) 211 can be configured to update the listed endpoints upon receiving updated status information indicating the addition or removal of endpoints in remote cluster 220. For example, controller(s) 211 can be configured to receive status information from controller(s) 221 indicating that remote cluster 220 added a new endpoint associated with a new service-providing node. Controller(s) 211 can be configured to associate this new endpoint with services 215 and begin monitoring this endpoint.

Figure 3:
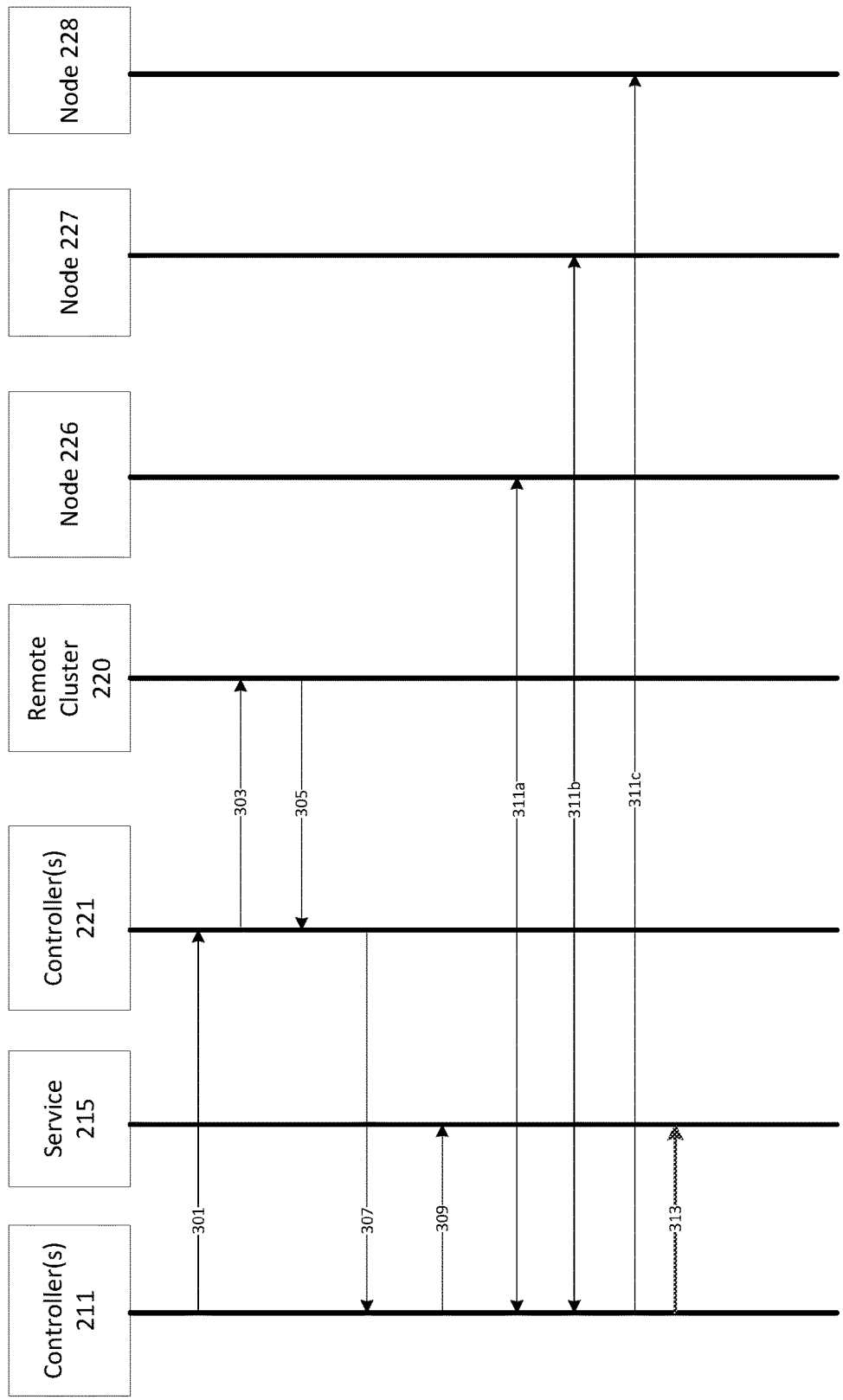
FIG. 3 depicts an exemplary flowchart illustrating automatic cross-cluster service provision.

In some embodiments, system 200 can be configured to maintain multiple instances of controller(s) 211 and controller(s) 221. Maintaining multiple instances of these controllers can increase system robustness and reliability. For example, each of local cluster 210 and remote cluster 220 can be configured to include one primary controller and at least one backup controller. Should the primary controller cease functioning, the backup controller can assume responsibility for provisioning the cluster. As a non-limiting example, local cluster 210 and/or remote cluster 220 can be configured with three or more instances of a controller. FIG. 3 depicts a flowchart illustrating automatic cross-cluster service provision consistent with disclosed embodiments. In step 301, consistent with disclosed embodiments, controller(s) 211 can be configured to provide a request for status information to controller(s) 221. The request protocol is not intended to be limiting. As a non-limiting example, the request can comprise a SOAP object, a JSON object, an XML message, a remote procedure call, an HTTP request message, an SMTP message, or a message in another similar protocol known to one of skill in the art.

In step 303, controller 221 can be configured to request status information for remote cluster 220. In some aspects, controller(s) 221 can be configured to maintain a repository (e.g., a data structure, file, or database) of status information, and can update the repository by requesting status information for remote cluster 220 repeatedly, periodically, at scheduled times, or in response to an event. In various aspects, controller(s) 221 can be configured to request status information for remote cluster 220 in response to a request from controller(s) 211. Controller(s) 221 can request this status information from remote cluster 220 (e.g., a management or configuration program running on remote cluster 220), from the nodes running on cluster 220, or from some combination of these sources.

In step 305, controller(s) 221 can receive the status information for remote cluster 220. This status information can describe all of the nodes on remote cluster 120, or a subset of the nodes on remote cluster 120. The subset of the nodes can include nodes matching one or more subsetting criteria provided by controller(s) 221. For example, the status information can include information, such as accessible endpoints for the nodes or the subset of the nodes on remote cluster 220. In some embodiments, the information for each node can include a label categorizing the node. These labels or categories can differentiate the nodes based on function, endpoints exposed by the nodes, current load or state (e.g., running or halted), applications running within the node, or other criteria known to one of skill in the art.

In some embodiments, controller(s) 221 can be configured to select a subset of the endpoints exposed by the nodes running on the service-providing cluster (e.g., remote cluster 220). For example, controller(s) 221 can generate a subset of endpoints including only the endpoints corresponding to nodes satisfying one or more subsetting criteria. The one or more subsetting criteria may include endpoints corresponding to nodes that provide a particular service or nodes that are currently running, etc. The one or more subsetting criteria can be predetermined, or provided by controller(s) 211 in the request. In some embodiments, a node may satisfy the one or more subsetting criteria when one or more labels for the node satisfy the one or more subsetting criteria.

In step 307, controller(s) 221 can provide a response to controller(s) 211. The can indicate the subset of endpoints. For example, the response can include a list of endpoints, such as endpoints corresponding to nodes satisfying one or more subsetting criteria. The response protocol is not intended to be limiting. As a non-limiting example, the response can comprise a SOAP object, a JSON object, an XML message, a remote procedure call, an HTTP request message, an SMTP message, or a message in another similar protocol known to one of skill in the art. In this manner, remote cluster 220 can be configured to provide an interface that allows controller(s) 211 to access the relevant topology of the remote cluster 220 to retrieve status information for nodes currently operating on this cluster. Additionally or alternatively, controller(s) 221 can provide status information concerning all the nodes on remote cluster 220. Controller(s) 211 may then determine a subset of endpoints satisfying one or more subsetting criteria based on the status information for all of the nodes of cluster 220.

In some embodiments, controller(s) 221 can be configured to require authentication and/or authorization of controller(s) 211 before providing status information to controller(s) 211. This authentication and/or authorization can be performed by controller(s) 221 or by another authentication system (e.g., a centralized authentication and authorization server). In some embodiments, the authentication system can be a component of remote cluster 220, or of a different system. In some embodiments, local cluster 210, remote cluster 220, and the authentication system can be associated with the same entity. For example, they can all be directed or controlled by the same company or individual. In various embodiments, local cluster 210, remote cluster 220, and the authentication system can be associated with different entities. For example, the authentication system can be directed or controlled by a trusted third party.

Controller(s) 211 can be authenticated and/or authorized according to methods known to one of skill in the art. For example, controller(s) 221 can be authenticated using a password authentication protocol, a challenge-handshake authentication protocol, an extensible authentication protocol, or other authentication protocols known in the art. Controller(s) 211 can be configured to respond to a request for status information with a request for authentication information, or can be configured to redirect requests for status information to another system for authentication and authorization, according to methods known to one of skill in the art. In some embodiments, controller(s) 211 can be configured to communicate with controller(s) 221 using a secure communication protocol (e.g., HTTPS).

In step 309, controller(s) 211 can configure service 215 based on the status information received from controller(s) 221. For example, when service 215 is a service object (e.g., when the cluster is an OPENSHIFT cluster or other container-based software deployment cluster), controller(s) 211 can update the service object by adding or removing endpoints specified for that service object based on the status information received from controller(s) 221. For example, the service object can include, as a property or field of the service object, a list of endpoints of the nodes of remote cluster 220 for providing the service. Controller(s) 211 can provide instructions for updating the values of the property or field of the service object. For example, controller(s) 211 can provide instructions to replace the existing list with a new list of endpoints, or instructions to add and/or remove endpoints from the existing list of endpoints. Service 215 can then route requests from the service-consuming nodes in local cluster 210 to service-providing nodes in remote cluster 220 based on the retrieved status information.

In steps 311a, 311b, and 311c, controller(s) 211 can intermittently communicate with the service-providing nodes to ensure that they are reachable from the specified endpoints (e.g., endpoint 216, endpoint 217, and endpoint 218) of service 215. For example, the controller(s) 211 may perform a health check on the endpoint. This health check may include one or more attempts to contact the endpoint using a particular protocol (e.g., TCP, UDP, SCTP, SSL, HTTP, HTTPS) according to methods known to one of skill in the art. In some embodiments, controller(s) 211 can be configured to communicate with the service-providing nodes (e.g., node 226, node 227, and node 228) directly. In various embodiments, controller(s) 211 can be configured to communicate with the nodes using calls to service 215. In this manner, controller(s) 211 can determine an "endpoint readiness" for the service-providing nodes of remote cluster 220. For example, by calling service 215, controller(s) 211 may obtain a list of reachable endpoints of the service-providing notes of remote cluster 220 that are visible to service 215 running on local cluster 210. The particular protocol used for the communication between controller(s) 211 and the service-providing nodes could be customizable, and could be determined during configuration of controller(s) 211, or changed during operation of controller(s) 211.

When controller(s) 211 determines that an endpoint is no longer reachable, that endpoint can be removed from the list of endpoints providing the service. For example, as shown in FIG. 3, node 228 fails to respond to communication attempts from controller(s) 211 in step 311c. In some embodiments, controller(s) 211 can reconfigure services 215 in response to this failure. For example, controller(s) 211 can contact service 215 as described above with regard to step 309 and remove the endpoint corresponding to node 228 from the list of endpoints for service 215. Because the service 215 performs load balancing using a virtual IP address, such a change to the list of endpoints will not be visible to the service-consuming nodes running on local cluster 210. Thus the service-consuming nodes can benefit from a consistent service address.

As another benefit, additional resources can be dynamically added and/or removed from remote cluster 220 without causing problems with provision of the service in local cluster 210. For example, as service-providing nodes are removed, controller(s) 211 and controller(s) 221 cooperate to determine that the endpoints corresponding to these nodes are no longer active and to remove them from the list of endpoints. As service-providing nodes are added, controller(s) 211 and controller(s) 221 cooperate to add endpoints corresponding to these nodes are added to the list of endpoints (or status information) retrieved by controller(s) 211. These new endpoints are then integrated into service provision.

Consistent with disclosed embodiments, controller(s) 211 can repeatedly retrieve the status information from controller(s) 221. For example, the status information can retrieved periodically, with some predetermined duration separating the requests for status information. As an additional example, the status information can be retrieved at scheduled times. As a further example, the status information can be retrieved in response to an event. For example, controller(s) 211 can retrieve status information from controller(s) 221 in response to a determination that the number of reachable endpoints for service 215 has fallen below a predetermined threshold. Similarly, controller(s) 211 can retrieve status information from controller(s) 221 in response to a determination that additional endpoints are required to satisfy performance criteria for service 215. As a further example, controller(s) 211 can retrieve status information from controller(s) 221 in response to a configuration request received from system 200, from a node of local cluster 210, or another system. As would be appreciated by one of skill in the art, controller(s) 221 can be configured to similarly push status information to controller(s) 211. For example, controller(s) 221 can push such information to controller(s) 211 repeatedly, periodically, at scheduled times, or in response to an event.

In some embodiments, controls(s) 221 and controllers(s) 211 include data structures and instructions stored in a non-transitory computer-readable medium, which when executed, cause one or more processors to perform the steps or functions consistent with the present disclosure. The computer-readable medium may be a storage device having the data structures and instructions stored thereon. Examples of a computer-readable storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a cache, a register, a compact disc read-only memory (CD-ROM), or any other non-transitory computer-readable medium that may be used to store information capable of being accessed by a computer device.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible non-transitory computer-readable storage media, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for cross-cluster service provision, comprising:
   a first computing cluster, including:
      service-providing nodes, and
      a first controller that collects status information concerning the service-providing nodes, the status information indicating at least one service-providing node endpoint; and
   a second computing cluster comprising,
      service-consuming nodes,
      a service that receives requests for the service from the service-consuming nodes and distributes the requests among a set of specified endpoints, and
      a second controller that performs health checks on the specified endpoints, retrieves the status information from the first controller, and updates the set of specified endpoints based on the status information;
      wherein updating the set of specified endpoints includes at least one of adding another endpoint to the set of specified endpoints and removing an existing endpoint from the set of specified endpoints.

2. The system of claim 1, wherein the second controller removes endpoints failing the health checks from the set of specified endpoints.

3. The system of claim 1, wherein the second controller requests the status information from the first controller repeatedly, periodically, at scheduled times, or in response to an event.

4. The system of claim 1, wherein collecting the status information comprises receiving status information for nodes in the first computing cluster including the service-providing nodes and the first controller determines a subset of the received status information concerning the service-providing nodes.

5. The system of claim 4, wherein the first controller determines the subset of the received status information based on labels included in the received status information that categorize the nodes.

6. The system of claim 1, wherein the retrieved status information comprises status information for nodes in the first computing cluster including the service-providing nodes and the second controller determines a subset of the retrieved status information concerning the service-providing nodes.

7. The system of claim 4, wherein the second controller determines the subset of the received status information based on labels included in the retrieved status information that categorize the service-providing nodes.

8. A method for cross-cluster service provision, comprising:
   receiving, by a first controller on a first computing cluster that includes service-providing nodes associated with endpoints, a request for status information for the service-providing nodes;
   providing, by the first controller to a second controller on a second computing cluster that includes a service object and service-consuming nodes, a response to the request including the status information for the service-providing nodes;
   receiving, by the service-providing nodes through the endpoints, health checks from the second controller and service requests from the service object; and
   updating, by the second controller, a set of specified endpoints based on the status information for the service-providing nodes;
   wherein updating the set of specified endpoints includes at least one of adding another endpoint to the set of specified endpoints and removing an existing endpoint from the set of specified endpoints.

9. The method of claim 8, wherein the request for status information is received repeatedly, periodically, at scheduled times, or in response to an event.

10. The method of claim 9, wherein the event comprises a determination that a number of reachable endpoints for the service object is less than a predetermined threshold, a determination that additional endpoints are required to satisfy performance criteria for the service, and a configuration request.

11. The method of claim 8, further comprising generating, by the first controller, the response based on status information for the service-providing nodes of the first computing cluster and one or more subsetting criteria.

12. A method for cross-cluster service provision, comprising:
   providing, by a second controller on a second computing cluster that includes a service object and service-consuming nodes to a first controller on a first computing cluster that includes service-providing nodes associated with endpoints, a request for status information for the service-providing nodes;
   receiving, by the second controller from the first controller in response to the request, status information for the service-providing nodes;
   reconfiguring, by the second controller, the service object based on the status information for the service-providing nodes, wherein reconfiguring the service object includes at least one of specifying another endpoint of the service object and deleting a specified endpoint of the service object;
   providing, by the second controller, health checks to the service-providing nodes; and
   providing, by the service-consuming nodes, service requests from the service object.

13. The method of claim 12, wherein the request for status information is provided repeatedly, periodically, at scheduled times, or in response to an event at scheduled times, or in response to an event.

14. The method of claim 13, wherein the event comprises at least one of a determination that a number of reachable endpoints for the service object is less than a predetermined threshold, a determination that additional endpoints are required to satisfy performance criteria for the service object, and a configuration request.

15. The method of claim 12, further comprising determining, by the second controller, a subset of the status information based on one or more subsetting criteria and using the subset of the status information to reconfigure the service object.

16. The method of claim 12, wherein the second controller reconfigures the service object by deleting specified endpoints of the service object that fail the health checks.

\* \* \* \* \*